(12) United States Patent
Tsai et al.

(10) Patent No.: US 12,323,683 B2
(45) Date of Patent: Jun. 3, 2025

(54) SENSING DEVICE FOR IMPROVING THE SPEED OF IMAGE SENSING

(71) Applicant: InnoLux Corporation, Miao-Li County (TW)

(72) Inventors: Ya-Li Tsai, Miao-Li County (TW); Hui-Ching Yang, Miao-Li County (TW); Yang-Jui Huang, Miao-Li County (TW); Te-Yu Lee, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 333 days.

(21) Appl. No.: 18/050,610

(22) Filed: Oct. 28, 2022

(65) Prior Publication Data

US 2023/0179844 A1 Jun. 8, 2023

(30) Foreign Application Priority Data

Dec. 3, 2021 (CN) .......................... 202111466454.4

(51) Int. Cl.
*H04N 23/50* (2023.01)
*G03B 7/083* (2021.01)

(52) U.S. Cl.
CPC .............. *H04N 23/50* (2023.01); *G03B 7/083* (2013.01)

(58) Field of Classification Search
CPC ...... H04N 23/50; H04N 25/709; H04N 25/78; G03B 7/083
See application file for complete search history.

(56) References Cited

U.S. PATENT DOCUMENTS

| 11,941,210 B2* | 3/2024 | Tsai | G06F 3/042 |
| 2003/0214861 A1* | 11/2003 | Takano | G11C 7/1021 |
| | | | 365/200 |
| 2005/0185078 A1* | 8/2005 | Segura-Puchades | H04N 25/77 |
| | | | 348/E3.018 |
| 2008/0078923 A1* | 4/2008 | Hirose | H04N 23/65 |
| | | | 250/214.1 |
| 2009/0253239 A1* | 10/2009 | Coolbaugh | H01L 29/7322 |
| | | | 257/E21.37 |

(Continued)

OTHER PUBLICATIONS

TW Office Action dated Feb. 7, 2023 in Taiwan application No. 111118667.

*Primary Examiner* — Chiawei Chen
(74) *Attorney, Agent, or Firm* — McClure, Qualey & Rodack, LLP

(57) ABSTRACT

A sensing device is provided herein, which operates in a reset period, an exposure period, and a readout period. The sensing device includes a first transistor, a second transistor, a detection device, and a third transistor. The first transistor includes a control terminal and a first terminal. The second transistor is coupled to the first transistor and configured to set the voltage of the control terminal during the exposure period. The sensing device is coupled to the first transistor and configured to change the voltage of the control terminal during the exposure period. The third transistor is coupled to the first transistor and includes an output terminal outputting a sense signal from the first terminal during the readout period. The first transistor is an N-type transistor and the third transistor is a P-type transistor.

20 Claims, 7 Drawing Sheets

(56) References Cited

U.S. PATENT DOCUMENTS

| | | | |
|---|---|---|---|
| 2013/0082936 A1* | 4/2013 | Islamkulov | H04N 25/77 |
| | | | 250/208.2 |
| 2016/0064443 A1* | 3/2016 | Inoue | H01L 27/14632 |
| | | | 257/43 |
| 2016/0190199 A1* | 6/2016 | Roy | H01L 27/14612 |
| | | | 257/292 |
| 2016/0360132 A1* | 12/2016 | Kanehara | H04N 25/745 |
| 2017/0148784 A1* | 5/2017 | Xu | H01L 23/645 |
| 2017/0309667 A1* | 10/2017 | Yamashita | H01L 27/14643 |
| 2018/0308981 A1 | 10/2018 | Wu et al. | |
| 2021/0185199 A1* | 6/2021 | Schneider, Jr. | H04N 25/535 |
| 2021/0352237 A1* | 11/2021 | Cheng | H01L 27/14612 |
| 2022/0201228 A1* | 6/2022 | Furui | H04N 25/76 |

* cited by examiner

SENSING DEVICE FOR IMPROVING THE SPEED OF IMAGE SENSING

CROSS REFERENCE TO RELATED APPLICATIONS

This Application claims priority of China Patent Application No. 202111466454.4, filed on Dec. 3, 2021, the entirety of which is incorporated by reference herein.

BACKGROUND OF THE INVENTION

Field of the Invention

The disclosure is generally related to a sensing device, and more particularly it is related to a sensing device for improving the speed of image sensing.

Description of the Related Art

An image sensor mainly utilizes an Active Pixel Sensor (APS) as a communication interface between the photosensitive element and the back-end reading system, and a pixel circuit often provides the signal changes generated by the photosensitive element due to illumination to the back-end reading system by using a source follower. However, the electron mobility of thin film transistors made of glass is much lower than that of semiconductor devices in integrated circuits. Increasing the area of the sensing device causes the operating time of the image sensor to increase accordingly. Therefore, it is necessary to optimize the sensing speed of the image sensor.

BRIEF SUMMARY OF THE INVENTION

In an embodiment, a sensing device configured to operate in a reset period, an exposure period, and a readout period is provided. The sensing device comprises a first transistor, a second transistor, a sensing element, and a third transistor. The first transistor comprises a control terminal and a first terminal. The second transistor is coupled to the first transistor and configured to set a voltage of the control terminal during the reset period. The sensing element is coupled to the first transistor and configured to change the voltage of the control terminal during the exposure period. The third transistor is coupled to the first transistor and comprises an output terminal. The output terminal is configured to output a sense signal from the first terminal during the readout period. The first transistor is an N-type transistor, and the third transistor is a P-type transistor.

In another embodiment, a sensing device comprises a sensing circuit, a readout line, a current mirror, a processor, and an output transistor. The readout line is coupled to the sensing circuit. The current mirror is coupled to the readout line. The output transistor is coupled between the readout line and the processor. The output transistor comprises a control terminal, a first terminal, and a second terminal. The control terminal is coupled to the readout line, the first terminal is coupled to a reference voltage, and the second terminal is coupled to the processor.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
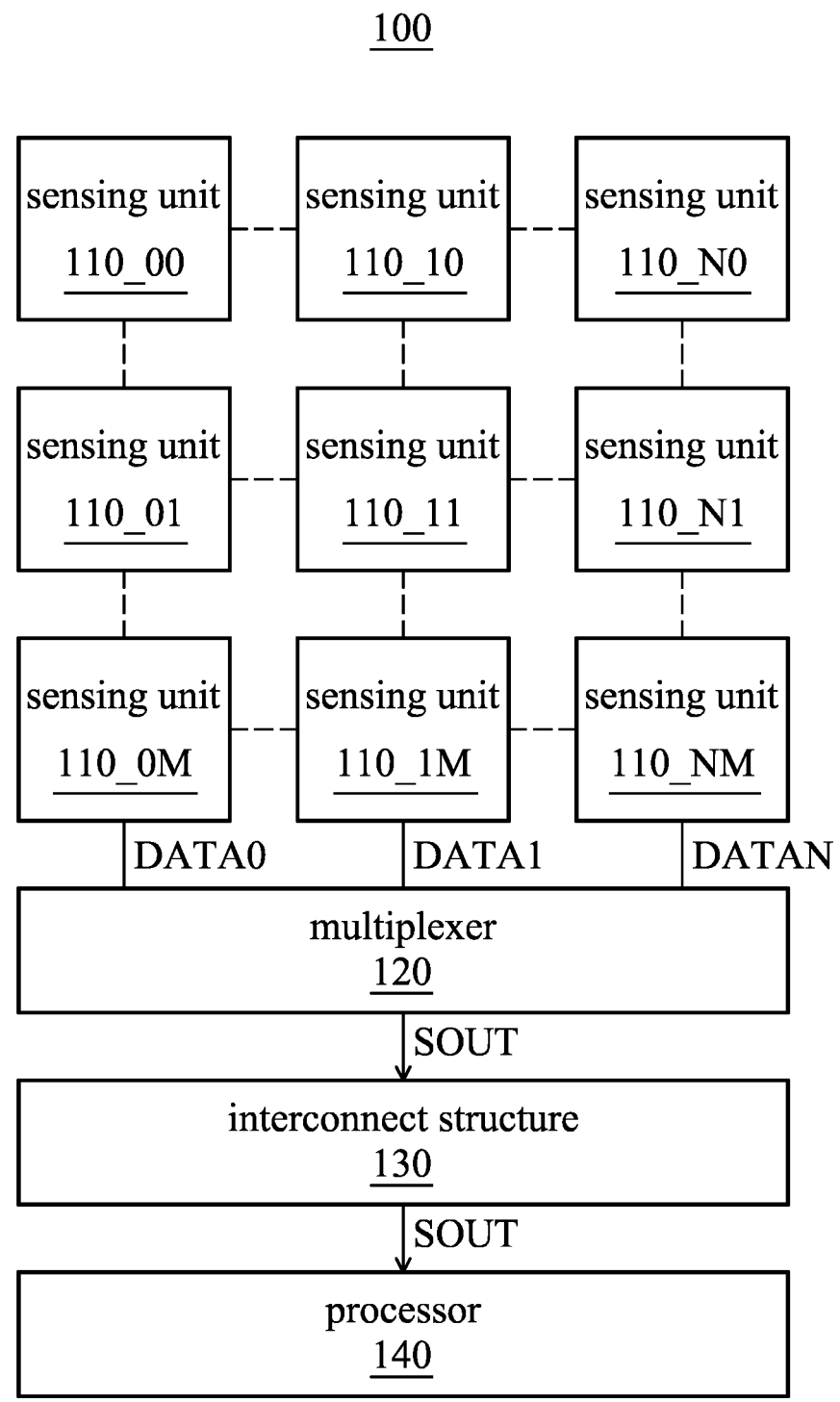
FIG. 1 shows a block diagram of a sensing device in accordance with an embodiment of the present disclosure.

This description is made for the purpose of illustrating the general principles of the invention and should not be taken in a limiting sense. In addition, the present disclosure may repeat reference numerals and/or letters in the various examples. This repetition is for the purpose of simplicity and clarity and does not in itself dictate a relationship between the various embodiments and/or configurations discussed. The scope of the invention is best determined by reference to the appended claims.

It would be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It is understood that the following disclosure provides many different embodiments, or examples, for implementing different features of the application. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact. Furthermore, the terms of joining and connecting may also include the case where both structures are movable or both structures are fixed. In addition, the term "coupled" includes any direct and indirect electrical connection means.

The electrical connection or coupling described in this disclosure may refer to direct connection or indirect connection. In the case of direct connection, the terminals of two devices in a circuit are directly connected or connected to each other through a conducting line. In the case of indirectly connection, there are switches, diodes, capacitors, inductors, resistors, other suitable components or a combination of the components mentioned above between the terminals of two devices in a circuit, but it is not intended to be limited thereto.

FIG. 1 shows a block diagram of a sensing device in accordance with an embodiment of the present disclosure. As shown in FIG. 1, the sensing device 100 includes a plurality of sensing units 110_00, 110_10, . . . , 110_N0, 110_01, 110_11, . . . , 110_N1, 110_0M, 110_1M, . . . , 110_NM, a multiplexer 120, an interconnect structure 130, and a processor 140. The sensing units 110_00, 110_01, . . . , 110_0N share a first readout line DATA0, the sensing units 110_10, 110_11, . . . , 110_1M share a second readout line DATA1, and the sensing units 110_N0, 110_N1, . . . , 110_NM share a (N+1)-th readout line DATAN.

The multiplexer 120 includes (N+1) switching elements (not shown in FIG. 1), in which the (N+1) switching elements are configured to select one of the first readout line DATA0, the second readout line DATA1, . . . , and the (N+1)-th readout lines DATAN as the data signal SDT. The interconnect structure 130 outputs the data signal SDT as the output signal SOUT and provides the output signal SOUT to the processor 140, so that the processor 140 determines the image data detected by the sensing units according to the data from one of the first readout line DATA0, a second readout line DATA1, . . . , and the (N+1)-th readout line DATAN. A detailed description of the operation of the sensing device 100 is provided below.

According to an embodiment of the present invention, the sensing device 100 is located in an electronic device. The electronic device may include, but is not limited to, a display device, a backlight device, an antenna device, a sensing device, or a splicing device. The electronic device may be a bendable or flexible electronic device. The display device may be a non-self-luminous display device or a self-luminous display device. The antenna device may be a liquid crystal antenna device or a non-liquid crystal antenna device, and the sensing device may be a sensing device for sensing capacitance, light, heat or ultrasonic waves, but not limited thereto. Electronic components may include passive and active components, such as capacitors, resistors, inductors, diodes, transistors, and the like. The diodes may include light emitting diodes or photodiodes. Light emitting diodes may, for example, include organic light emitting diodes (OLEDs), sub-millimeter light emitting diodes (mini LEDs), micro LEDs, or quantum dot light emitting diodes, but not limited thereto. The splicing device may be, for example, a display splicing device or an antenna splicing device, but not limited thereto. It should be noted that, the electronic device can be any arrangement and combination of the foregoing, but not limited thereto. Hereinafter, the present disclosure will be described by using the display device as the electronic device or the splicing device, but the present disclosure is not limited thereto.

Figure 2:
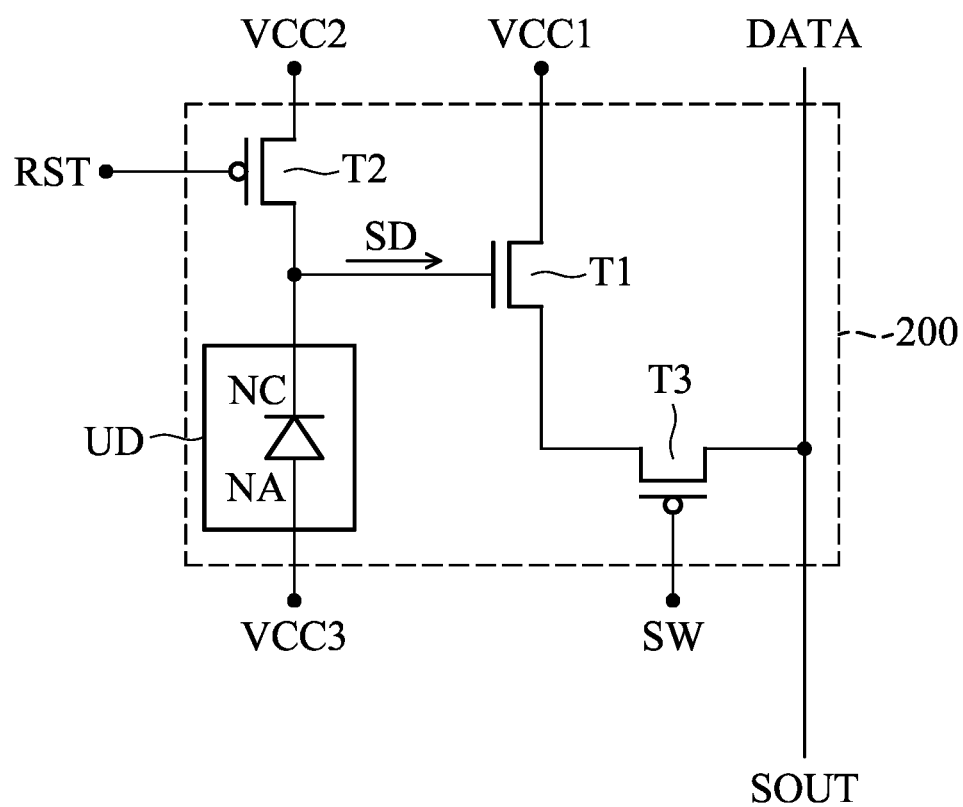
FIG. 2 shows a circuit diagram of a sensing unit in accordance with an embodiment of the present disclosure.

FIG. 2 shows a circuit diagram of a sensing unit in accordance with an embodiment of the present disclosure. As shown in FIG. 2, the sensing unit 200 includes a first transistor T1, a second transistor T2, a sensing element UD and a third transistor T3, in which the sensing unit 200 corresponds to any one of the sensing units 110_00, 110_10, . . . , 110_N0, 110_01, 110_11, . . . , 110_N1, 110_0M, 110_1M, . . . , 110_NM in FIG. 1.

The first transistor T1 includes a control terminal, a first terminal, and a second terminal, in which the first terminal of the first transistor T1 receives the first supply voltage VCC1. The second transistor T2 includes a control terminal, a first terminal, and a second terminal, in which the control terminal of the second transistor T2 receives the reset signal RST, the first terminal of the second transistor T2 receives the second supply voltage VCC2, and the second terminal of the second transistor T2 is coupled to the control terminal of the first transistor T1.

The third transistor T3 includes a control terminal, a first terminal and a second terminal, in which the control terminal of the third transistor T3 receives the switch signal SW, the first terminal of the third transistor T3 is coupled to the second terminal of the transistor T1, and the second terminal of the third transistor T3 is coupled to the readout line DATA. The readout line DATA corresponds to any one of the first readout line DATA0, the second readout line DATA1 . . . , the (N+1)-th readout line DATAN in FIG. 1.

The sensing element UD includes an anode terminal NA and a cathode terminal NC, in which the anode terminal NA receives the third supply voltage VCC3, and the cathode terminal NC is coupled to the control terminal of the first transistor T1 and the second terminal of the second transistor T2.

According to an embodiment of the present disclosure, the first transistor T1 is an N-type transistor, the second transistor T2 and the third transistor T3 are P-type transistors, in which the first transistor T1 being an N-type transistor type transistor and the second transistor T2 being a P-type transistor helps to reduce the leakage current flowing through the second transistor T2. According to another embodiment of the present disclosure, the second transistor T2 has a lightly doped drain (LDD) to reduce the leakage current flowing through the second transistor T2.

According to an embodiment of the present disclosure, when the sensing unit 200 operates in the reset period, the reset signal RST is at a low voltage level to turn on the second transistor T2, so that the second transistor T2 provides the supply voltage VCC2 to the control terminal of the first transistor T1 and the second terminal of the second transistor T2 to achieve the purpose of resetting the voltage at the control terminal of the first transistor T1.

According to an embodiment of the present disclosure, when the sensing unit 200 operates in the exposure period, the reset signal RST changes from a low voltage level to a high voltage level without turning on the second transistor T2, so that the sensing element UD performs sensing to generate a sense signal SD at the control terminal of the first transistor T1.

According to an embodiment of the present disclosure, when the sensing unit 200 operates in the readout period, the switch signal SW is at a low voltage level to turn on the third transistor T3, so that the first transistor T1 provides the sense signal SD at the control terminal of the transistor T1 to the readout line DATA through the third transistor T3.

According to an embodiment of the present disclosure, when the third transistor T3 is turned on, the switch signal SW may be a negative voltage, which helps to increase the source-to-gate voltage of the third transistor T3 and reduce the on-resistance of the third transistors T3 so that the signal of the readout line DATA reaches a steady state more quickly and the influence of the resistance value along the trace that the signal of the readout line DATA is transmitted may be mitigated.

Figure 3:
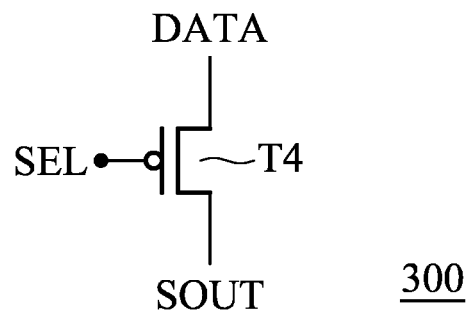
FIG. 3 shows a circuit diagram of a switching element in accordance with an embodiment of the present disclosure.

FIG. 3 shows a circuit diagram of a switching element in accordance with an embodiment of the present disclosure. As shown in FIG. 3, the switching element 300 includes a fourth transistor T4. The fourth transistor T4 includes a control terminal, a first terminal, and a second terminal, in which the control terminal of the fourth transistor T4 receives the selection signal SEL, the first terminal of the fourth transistor T4 is coupled to the readout line DATA, and the second terminal of the fourth transistor T4 is coupled to the data signal SDT. According to an embodiment of the present disclosure, the readout line DATA in FIG. 4 corresponds to any one of the first readout line DATA0, the second readout line DATA1, . . . , and the (N+1)-th readout line DATAN in FIG. 1.

In other words, the multiplexer 120 in FIG. 1 includes a plurality of switching elements 300 having a fourth transistor T4, and the switching elements 300 select one of the first readout line DATA0, the second readout line DATA1 . . . , and the (N+1)-th readout line DATAN as the data signal SDT according to the corresponding selection signal SEL, and the interconnect structure 130 outputs the data signal SDT as the output signal SOUT and provides the output signal SOUT to the processor 140. According to an embodiment of the present disclosure, the fourth transistor T4 is a P-type transistor.

Figure 4:
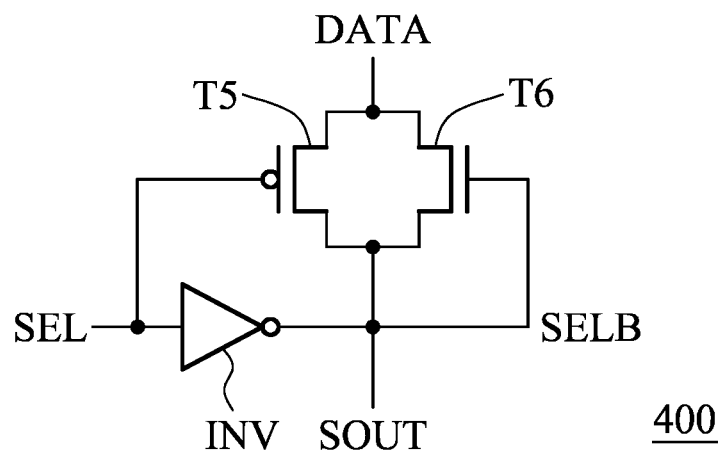
FIG. 4 shows a circuit diagram of a switching element in accordance with another embodiment of the present disclosure.

FIG. 4 shows a circuit diagram of a switching element in accordance with another embodiment of the present disclosure. As shown in FIG. 4, the switching element 400 includes a fifth transistor T5, a sixth transistor T6, and an inverter INV. The fifth transistor T5 includes a control terminal, a first terminal, and a second terminal, in which the control terminal of the fifth transistor T5 receives the selection signal SEL, and the first terminal of the fifth transistor T5 is coupled to the readout line DATA, The second terminal of the fifth transistor T5 outputs the data signal SDT.

The sixth transistor T6 includes a control terminal, a first terminal, and a second terminal, in which the control terminal of the sixth transistor T6 receives the inverted selection signal SELB, and the first terminal of the sixth transistor T6 is coupled to the readout line DATA, the second terminal of the sixth transistor T6 outputs the data signal SDT. The inverter INV is configured to invert the selection signal SEL to generate the inverted selection signal SELB. According to an embodiment of the present disclosure, the fifth transistor T5 is a P-type transistor, and the sixth transistor T6 is an N-type transistor.

According to an embodiment of the present disclosure, the readout line DATA in FIG. 4 corresponds to any one of the first readout line DATA0, the second readout line DATA1 . . . , and the (N+1)-th readout line DATAN in FIG. 1. In other words, the multiplexer 120 in FIG. 1 includes a plurality of switching elements 400 having a fifth transistor T5, a sixth transistor T6, and an inverter INV, and the switching elements 400 select one of the first readout line DATA0, the second readout line DATA1 . . . , and the (N+1)-th readout line DATAN to be provided to the processor 140 through the interconnect structure 130.

Figure 5:
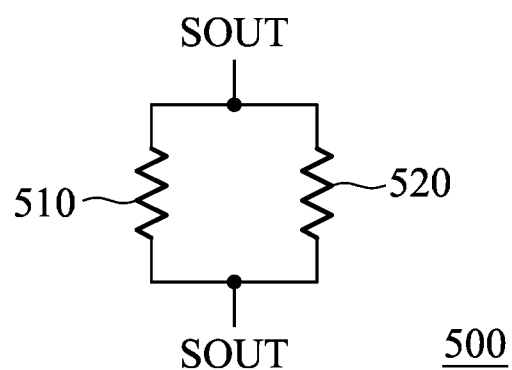
FIG. 5 shows a schematic diagram of a connection structure in accordance with an embodiment of the present disclosure.

FIG. 5 shows a schematic diagram of a connection structure in accordance with an embodiment of the present disclosure. As shown in FIG. 5, the interconnect structure 500 includes a first line 510 and a second line 520, in which the first line 510 and the second line 520 are coupled between the data signal SDT and the output signal SOUT and connected in parallel with each other. According to other embodiments of the present disclosure, the interconnect structure 500 may include any number of lines. FIG. 5 only illustrates the first line 510 and the second line 520 for example, and is not intended to be limited thereto.

According to an embodiment of the present disclosure, the first line 510 and the second line 520 belong to different metal layers respectively, so that the first line 510 and the second line 520 are connected in parallel to reduce the overall resistance value of the connection structure 500. For example, the first line 510 is formed on the first metal layer and the second line 520 is formed on the second metal layer, in which the first metal layer and the second metal layer are different. The first circuit 510 formed on the first metal layer and the second circuit 520 formed on the second metal layer are merely illustrated herein for illustration and explanation, and it is not limited thereto.

According to an embodiment of the present disclosure, the first line 510 and the second line 520 are made of low-resistance materials, in which the sheet resistance of the first line 510 and the second line 520 ranges from 0.05 ohms to 0.6 ohms. According to some embodiments of the present disclosure, the low resistance material forming the first line 510 and the second line 520 includes molybdenum (Mo), copper (Cu), titanium (Ti), and aluminum (Al). According to another embodiment of the present disclosure, the first circuit 510 and the second circuit 520 are formed by a stack of multilayer metal, in which the material of the multilayer metal is a stack of molybdenum, aluminum, and molybdenum (Mo/Al/Mo).

Figure 6:
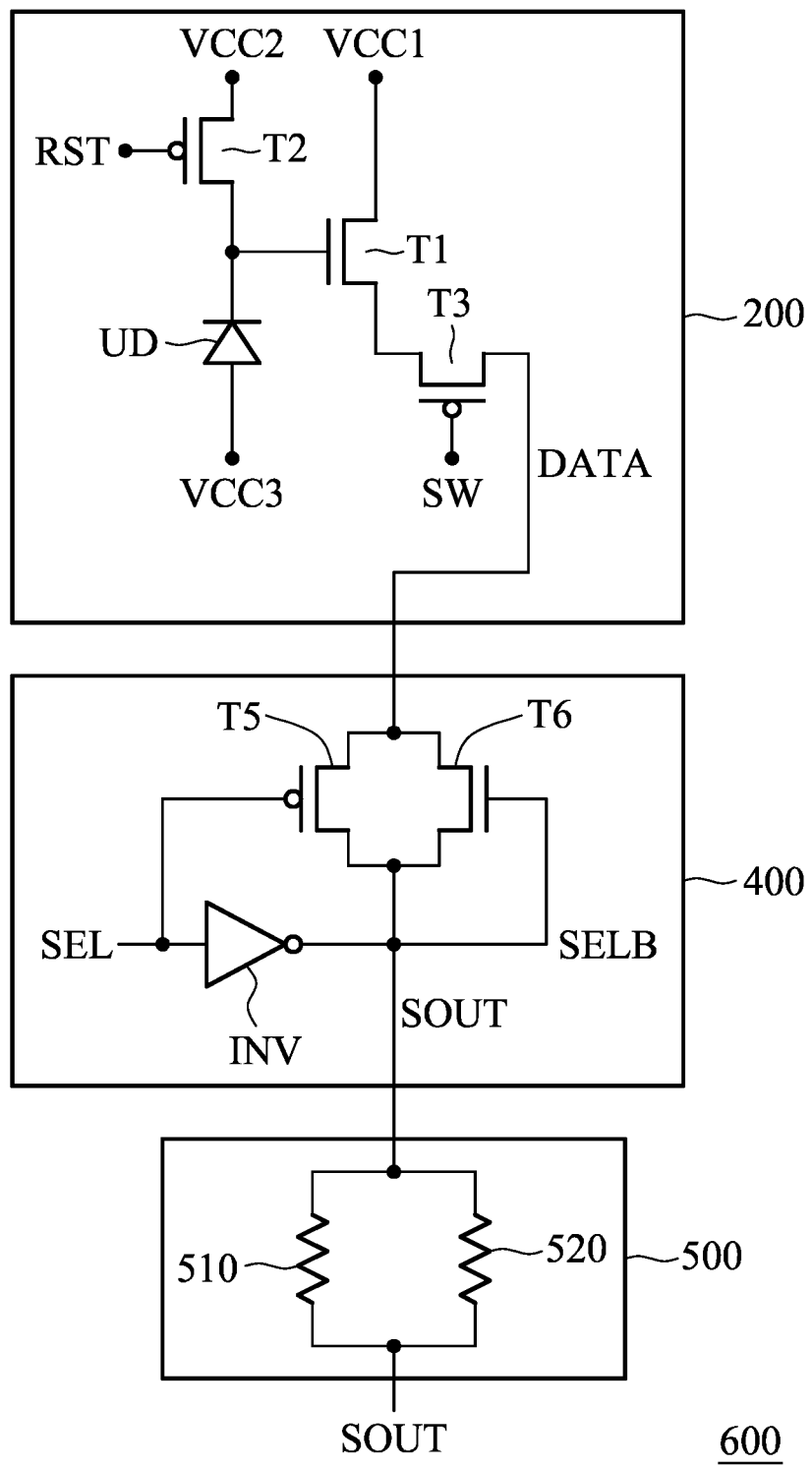
FIG. 6 shows a circuit diagram of a sensing device in accordance with an embodiment of the present disclosure.

FIG. 6 shows a circuit diagram of a sensing device in accordance with an embodiment of the present disclosure. As shown in FIG. 6, the sensing device 600 includes a sensing unit 200, a switching element 400 and a interconnect structure 500, in which the sensing unit 200 corresponds to the sensing units 110_00 . . . , 110_NM in FIG. 1, and the switching element 400 corresponds to the switching elements (not shown in FIG. 1) of the multiplexer 120 in FIG. 1, the interconnect structure 500 corresponds to the interconnect structure 130 in FIG. 1. According to an embodiment of the present disclosure, when the sensing element UD of the sensing unit 200 senses an image, the switching element 400 selects the readout line DATA as the data signal SDT according to the selection signal SEL, and provides the data signal SDT to the processor 140 of FIG. 1 through the connection structure 500.

Figure 7:
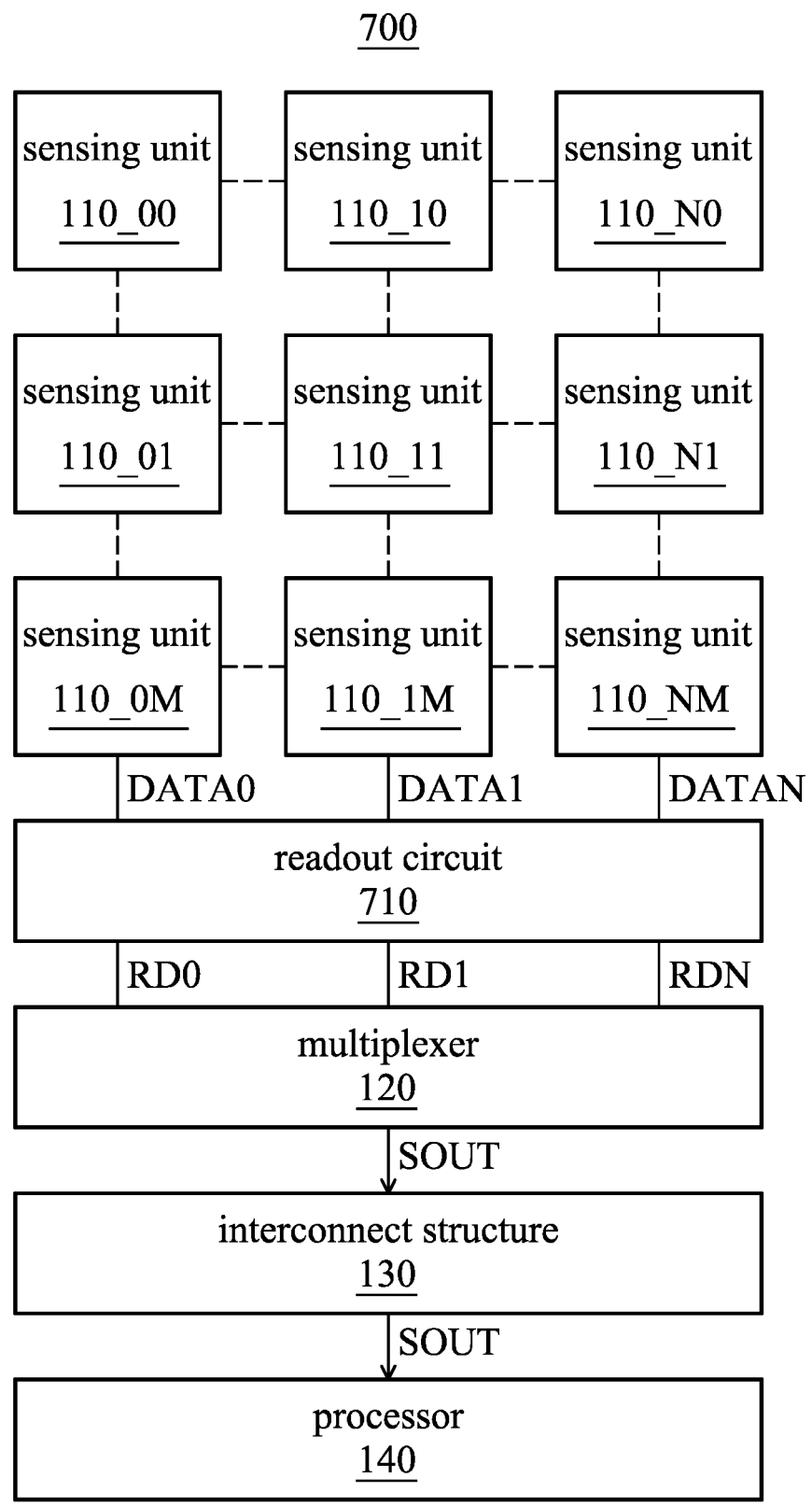
FIG. 7 shows a block diagram of a sensing device in accordance with an embodiment of the present disclosure.

FIG. 7 shows a block diagram of a sensing device in accordance with an embodiment of the present disclosure. Comparing the sensing device 700 with the sensing device 100 in FIG. 1, the sensing device 700 further includes a readout circuit 710. The readout circuit 710 is located between the plurality of sensing units 110_00 . . . , 110_NM and the multiplexer 120 and configured to convert the data of the first readout line DATA0, the second readout line DATA1 . . . , and the (N+1)-th readout line DATAN to the first readout data RD0, the second readout data RD1 . . . , and the (N+1)-th readout data RDN. The multiplexer 120 is configured to select one of the first readout data RD0, the second readout data RD1 . . . , and the (N+1)-th readout data RD1 as the output signal SOUT and provide the output signal SDT to the processor 140.

Figure 8:
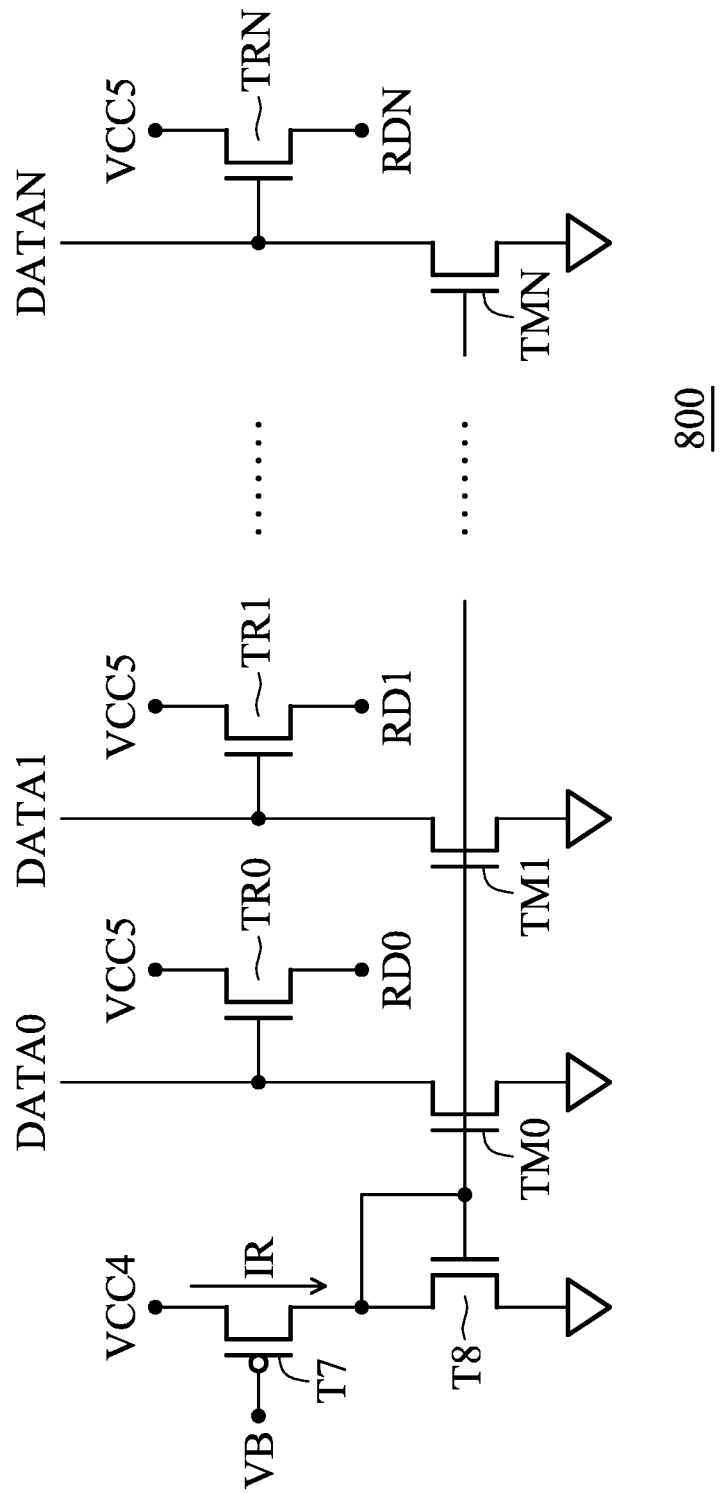
FIG. 8 shows a circuit diagram of a reading circuit in accordance with an embodiment of the present disclosure.

FIG. 8 shows a circuit diagram of a readout circuit in accordance with an embodiment of the present disclosure. As shown in FIG. 8, the readout circuit 800 includes a seventh transistor T7, an eighth transistor T8, a first mirror transistor TM0, a second mirror transistor TM1 . . . , an (N+1)-th mirror transistor TMN, a first output transistor TR0, a second output transistor TR1 . . . , and an (N+1)th output transistor TRN.

The seventh transistor T7 is configured to generate the reference current IR including a control terminal, a first terminal and a second terminal, in which the control terminal of the seventh transistor T7 receives the bias voltage VB and the first terminal of the seventh transistor T7 is coupled to the fourth supply voltage VCC4. The eighth transistor T8 includes a control terminal, a first terminal, and a second terminal, in which the control terminal of the eighth transistor T8 is coupled to the second terminal of the seventh transistor T7, the first terminal of the eighth transistor T8, and the second terminal of the eighth transistor T8 is coupled to the ground.

The first mirror transistor TM0 includes a control terminal, a first terminal, and a second terminal, in which the control terminal of the first mirror transistor TM0 is coupled to the control terminal of the eighth transistor T8, and the first terminal of the first mirror transistor TM0 is coupled to the first readout line DATA0, and the second terminal of the first mirror transistor TM0 is coupled to the ground.

The second mirror transistor TM1 includes a control terminal, a first terminal, and a second terminal, in which the control terminal of the second mirror transistor TM1 is coupled to the control terminal of the eighth transistor T8, the first terminal the second mirror transistor TM1 is coupled to the second readout line DATA1, and the second terminal of the second mirror transistor TM1 is coupled to the ground.

The (N+1)-th output transistor TRN includes a control terminal, a first terminal, and a second terminal, in which the control terminal of the (N+1)-th output transistor TRN is coupled to the control terminal of the eighth transistor T8 terminal, the first terminal of the (N+1)-th mirror transistor TMN is coupled to the (N+1)-th readout line DATAN, and the second terminal of the (N+1)-th mirror transistor TMN is coupled to ground.

According to an embodiment of the present disclosure, the eighth transistor T8, the first mirror transistor TM0, the second mirror transistor TM1 . . . , and the (N+1)-th mirror transistor TMN form a current mirror for mirroring the reference current IR to the first readout line DATA0, the second readout line DATA1, . . . , and the (N+1)-th readout line DATAN respectively. According to some embodiments of the present disclosure, the size ratios of the eighth transistor T8 to the first mirror transistor TM0, the second mirror transistor TM1, . . . , and the (N+1)-th mirror transistor TMN may be adjusted to enlarge or reduce the mirrored currents flowing the first mirror transistor TM0, the second mirror transistor TM1, . . . , and the (N+1)-th mirror transistor TMN.

The first output transistor TR0 includes a control terminal, a first terminal, and a second terminal, in which the control terminal of the first output transistor TR0 is coupled to the first readout line DATA0, the first terminal of the first output transistor TR0 is coupled to the fifth supply voltage VCC5, and the second terminal of the first output transistor TR0 outputs the first readout data RD0.

The second output transistor TR1 includes a control terminal, a first terminal and a second terminal, in which the control terminal of the second output transistor TR1 is coupled to the second readout line DATA1, the first terminal of the second output transistor TR1 is coupled to the fifth supply voltage VCC5, and the second terminal of the second output transistor TR1 outputs the second readout data RD1.

The (N+1)-th output transistor TRN includes a control terminal, a first terminal, and a second terminal, in which the control terminal of the (N+1)-th output transistor TRN is coupled to the (N+1)-th readout line DATAN, the first terminal of the (N+1)-th output transistor TRN is coupled to the fifth supply voltage VCC5, and the second terminal of the (N+1)-th output transistor TRN outputs the (N+1)-th readout data RDN.

According to an embodiment of the present disclosure, the first mirror transistor TM0, the second mirror transistor TM1 . . . , and the (N+1)th output transistor TRN are configured to provide the data sensed by the sensing units 110_00 . . . , 110_NM to the first output transistor TR0, the second output transistor TR1 . . . , and the (N+1)-th output transistor TRN through the first readout line DATA0, the second readout line DATA1 . . . , and (N+1)-th readout line DATAN respectively. Then, the second output transistor TR1 . . . , and the (N+1)-th output transistor TRN are configured to read the data of the first readout line DATA0, the second readout line DATA1 . . . , and (N+1)-th readout line DATAN respectively, thereby reducing the time for reaching a steady state when reading the data.

Figure 9:
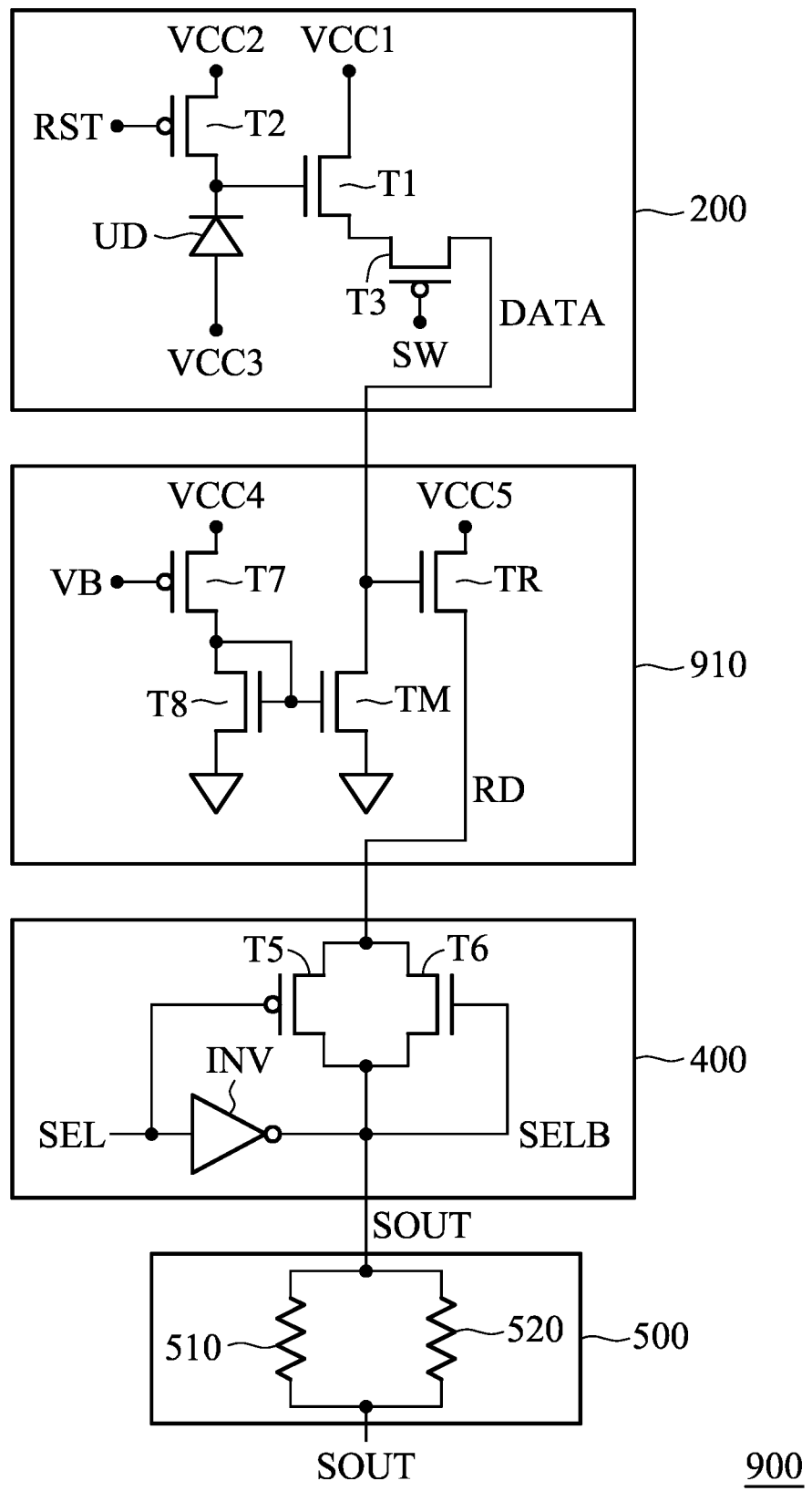
FIG. 9 shows a circuit diagram of a sensing device according to another embodiment of the present disclosure.

FIG. 9 shows a circuit diagram of a sensing device according to another embodiment of the present disclosure. Comparing the sensing device 900 of FIG. 9 with the sensing device 600 of FIG. 6, the sensing device 900 further includes a readout circuit 910, in which the readout circuit 910 is located between the sensing unit 200 and the switching element 400. According to an embodiment of the present disclosure, the mirror transistor TM of the read circuit 910 corresponds to any one of the first mirror transistor TM0, the second mirror transistor TM1 . . . , and the (N+1)-th mirror transistor TMN in FIG. 8, the output transistor TR of the reading circuit 910 corresponds to any one of the first output transistor TR0, the second output transistor TR1, . . . and the (N+1)-th output transistor TRN in FIG. 8, and the readout data RD of the read circuit 910 corresponds to any one of the first readout data RD0, the second readout data RD1 . . . , and the (N+1)-th readout data RDN.

According to an embodiment of the present disclosure, the sensing device 900 has a faster reading speed. According to another embodiment of the present disclosure, the sensing device 600 occupies less circuit area.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A sensing device configured to operate in a reset period, an exposure period, and a readout period, wherein the sensing device comprises:
   a first transistor, comprising a control terminal and a first terminal;
   a second transistor, coupled to the first transistor and configured to set a voltage of the control terminal during the reset period;

a sensing element, coupled to the first transistor and configured to change the voltage of the control terminal during the exposure period;

a third transistor, coupled to the first transistor and comprising an output terminal, wherein the output terminal is configured to output a sense signal from the first terminal during the readout period; and a readout circuit, coupled to the output terminal and comprising:

a current mirror, coupled to the readout line; and a supplying transistor, comprising a control terminal, a first terminal, and a second terminal, wherein the control terminal of the supplying transistor receives a bias voltage, the first terminal of the supplying transistor is coupled to a supply voltage, and the second terminal of the supplying transistor is coupled to the current mirror;

wherein the first transistor is an N-type transistor, and the third transistor is a P-type transistor.

2. The sensing device as defined in claim 1, wherein the second transistor is a P-type transistor.

3. The sensing device as defined in claim 2, wherein the second transistor comprises a lightly doped drain.

4. The sensing device as defined in claim 1, further comprising a readout line, and an output transistor, wherein the readout line is coupled to the output terminal, and the output transistor comprises a control terminal coupled to the readout line and a first terminal coupled one of a plurality of switching elements.

5. The sensing device as defined in claim 1, further comprising a readout line and a multiplexer, wherein the readout line is coupled to the output terminal, and the multiplexer is coupled to the readout line, wherein the multiplexer comprises a plurality of switch elements.

6. The sensing device as defined in claim 5, wherein each of the switching elements comprises a fourth transistor and a fifth transistor, wherein the fourth transistor is a P-type transistor, and the fifth transistor is an N-type transistor.

7. The sensing device as defined in claim 6, further comprising an inverter coupled between a control terminal of the fourth transistor and a control terminal of the fifth transistor.

8. The sensing device as defined in claim 5, wherein each of the switching elements comprises a fourth transistor, wherein the fourth transistor is a P-type transistor.

9. The sensing device as defined in claim 1, further comprising a processor and an interconnect structure coupled between the sensing device and the processor, wherein the interconnect structure comprises a first line and a second line, wherein the first line and the second line are in parallel.

10. The sensing device as defined in claim 9, wherein the sheet resistance of the first line and the second line ranges from 0.05 ohms to 0.6 ohms.

11. A sensing device, comprising:
a sensing circuit;
a readout line, coupled to the sensing circuit;
a readout circuit, comprising:
a current mirror, coupled to the readout line; and a supplying transistor, comprising a control terminal, a first terminal, and a second terminal, wherein the control terminal of the supplying transistor receives a bias voltage, the first terminal of the supplying transistor is coupled to a supply voltage, and the second terminal of the supplying transistor is coupled to the current mirror;

a processor; and an output transistor, coupled between the readout line and the processor, wherein the output transistor comprises a control terminal, a first terminal, and a second terminal, wherein the control terminal is coupled to the readout line, the first terminal is coupled to a reference voltage, and the second terminal is coupled to the processor.

12. The sensing device as defined in claim 11, wherein the sensing circuit comprises:

a first transistor, comprising a control terminal and a first terminal;

a second transistor, coupled to the first transistor and configured to set a voltage of the control terminal of the first transistor during a reset period;

a sensing element, coupled to the first transistor and configured to change the voltage of the control terminal during an exposure period; and a third transistor, coupled to the first transistor and comprising an output terminal, wherein the output terminal is configured to output a sense signal from the first terminal during a readout period;

wherein the first transistor is an N-type transistor and the third transistor is a P-type transistor.

13. The sensing device as defined in claim 12, wherein the second transistor is a P-type transistor.

14. The sensing device as defined in claim 13, wherein the second transistor comprises a lightly doped drain.

15. The sensing device as defined in claim 11, wherein the sensing circuit further comprises a multiplexer coupled between the readout line and the processor, wherein the multiplexer comprises a plurality of switch elements.

16. The sensing device as defined in claim 15, wherein each of the switching elements comprises a fourth transistor and a fifth transistor, wherein the fourth transistor is a P-type transistor, and the fifth transistor is an N-type transistor.

17. The sensing device as defined in claim 16, wherein the sensing circuit further comprises an inverter coupled between a control terminal of the fourth transistor and a control terminal of the fifth transistor.

18. The sensing device as defined in claim 15, wherein each of the switching elements comprises a fourth transistor, wherein the fourth transistor is a P-type transistor.

19. The sensing device as defined in claim 15, wherein the sensing circuit further comprises an interconnect structure coupled between the sensing device and the processor, wherein the interconnect structure comprises a first line and a second line, wherein the first line and the second line are in parallel.

20. The sensing device as defined in claim 19, wherein the sheet resistance of the first line and the second line ranges from 0.05 ohms to 0.6 ohms.

* * * * *